United States Patent
Subramanian et al.

(10) Patent No.: US 9,686,695 B2
(45) Date of Patent: Jun. 20, 2017

(54) METHODS AND APPARATUS FOR BEAM SEARCH AND TRACKING IN MM-WAVE ACCESS SYSTEMS

(71) Applicant: QUALCOMM Incorporated, San Diego, CA (US)

(72) Inventors: Sundar Subramanian, Bridgewater, NJ (US); Vasanthan Raghavan, North Brunswick, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 14/332,353

(22) Filed: Jul. 15, 2014

(65) Prior Publication Data

US 2016/0021549 A1 Jan. 21, 2016

(51) Int. Cl.
*H04W 40/12* (2009.01)
*H04B 7/06* (2006.01)
*H04W 16/28* (2009.01)
*H04W 76/02* (2009.01)

(52) U.S. Cl.
CPC ............. *H04W 16/28* (2013.01); *H04B 7/06* (2013.01); *H04B 7/0617* (2013.01); *H04W 40/12* (2013.01); *H04W 76/02* (2013.01)

(58) Field of Classification Search
None
See application file for complete search history.

(56) References Cited

U.S. PATENT DOCUMENTS

| 2012/0092217 A1* | 4/2012 | Hosoya | H01Q 3/267 342/373 |
| 2013/0155907 A1* | 6/2013 | Soffer | H01Q 3/26 370/255 |
| 2013/0272263 A1 | 10/2013 | Pi et al. | |

(Continued)

FOREIGN PATENT DOCUMENTS

| WO | 2013086164 A1 | 6/2013 |
| WO | 2013170169 A2 | 11/2013 |
| WO | 2014036150 A1 | 3/2014 |

OTHER PUBLICATIONS

Rangan S., et al., "Millimeter Wave Cellular Wireless Networks: Potentials and Challenges," Jan. 2014, pp. 1-17.

(Continued)

*Primary Examiner* — Robert C Scheibel
(74) *Attorney, Agent, or Firm* — Arent Fox, LLP

(57) ABSTRACT

A method, an apparatus, and a computer program product for operating a user equipment (UE) are provided. The apparatus determines a first coarse set of beamforming paths between the UE and a first millimeter wave base station (mmW-BS), receives on a first set of narrow beamforming paths close to a first beamforming path within the first coarse set of beamforming paths, requests the first mmW-BS to transmit on a second set of narrow beamforming paths close to a second beamforming path within the first coarse set of beamforming paths when a signal quality of the first beamforming path and the first set of narrow beamforming paths are less than a first threshold, and communicates through one of the second beamforming path or a path within the second set of narrow beamforming paths.

20 Claims, 12 Drawing Sheets

(56) References Cited

U.S. PATENT DOCUMENTS

| | | | |
|---|---|---|---|
| 2013/0308717 A1 | 11/2013 | Maltsev | |
| 2014/0073337 A1 | 3/2014 | Hong et al. | |
| 2014/0204902 A1* | 7/2014 | Maltsev | H04W 36/0083 370/331 |
| 2015/0004918 A1* | 1/2015 | Wang | H04W 88/02 455/73 |
| 2015/0215077 A1* | 7/2015 | Ratasuk | H04B 7/0623 455/436 |
| 2015/0230263 A1* | 8/2015 | Roy | H04W 36/0083 455/452.2 |
| 2015/0244071 A1* | 8/2015 | Shirakata | H04W 24/08 342/368 |
| 2015/0257073 A1* | 9/2015 | Park | H04W 36/30 370/331 |
| 2015/0341095 A1* | 11/2015 | Yu | H04W 72/085 370/252 |
| 2015/0341105 A1* | 11/2015 | Yu | H04B 7/088 370/328 |
| 2015/0382171 A1* | 12/2015 | Roy | H04W 48/16 370/329 |

OTHER PUBLICATIONS

International Search Report and Written Opinion—PCT/US2015/037014—ISA/EPO—Oct. 2, 2015.

* cited by examiner

Device-to-Device Communications System

METHODS AND APPARATUS FOR BEAM SEARCH AND TRACKING IN MM-WAVE ACCESS SYSTEMS

BACKGROUND

Field

The present disclosure relates generally to communication systems, and more particularly, to methods and apparatus for beam search and tracking in millimeter wave (mmW) access systems.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus determines a first coarse set of beamforming paths between the UE and a first millimeter wave base station (mmW-BS), receives on a first set of narrow beamforming paths close to a first beamforming path within the first coarse set of beamforming paths, requests the first mmW-BS to transmit on a second set of narrow beamforming paths close to a second beamforming path within the first coarse set of beamforming paths when a signal quality of the first beamforming path and the first set of narrow beamforming paths are less than a first threshold, and communicates through one of the second beamforming path or a path within the second set of narrow beamforming paths.

DETAILED DESCRIPTION

Figure 1:
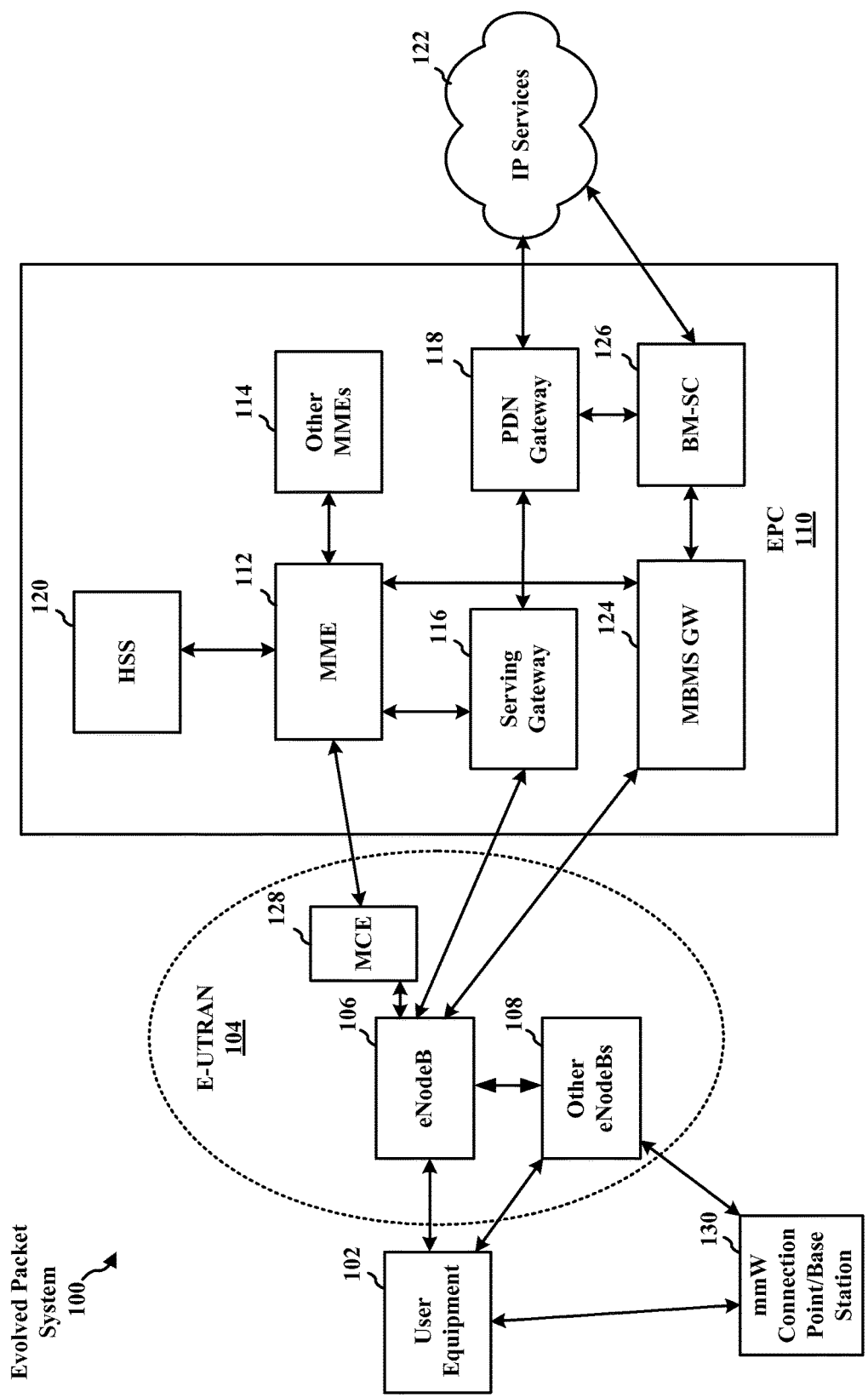
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

In an aspect, the UE 102 is capable of communicating signals via the LTE network and an mmW system. Accordingly, the UE 102 may communicate with the eNB 106 and/or the other eNBs 108 over a LTE link. Additionally, the UE 102 may communicate with a connection point (CP) or base station (BS) 130 (capable of mmW system communication) over an mmW link.

In a further aspect, at least one of the other eNBs 108 may be capable of communicating signals via the LTE network and the mmW system. As such, an eNB 108 may be referred to as a LTE+mmW eNB. In another aspect, the CP/BS 130 may be capable of communicating signals via the LTE network and the mmW system. As such, the CP/BS 130 may be referred to as a LTE+mmW CP/BS. The UE 102 may communicate with the other eNB 108 over a LTE link as well as over an mmW link.

In yet another aspect, the other eNB 108 may be capable of communicating signals via the LTE network and the mmW system, while the CP/BS 130 is capable of communicating signals via the mmW system only. Accordingly, the CP/BS 130 unable to signal the other eNB 108 via the LTE network may communicate with the other eNB 108 over an mmW backhaul link.

Figure 2:
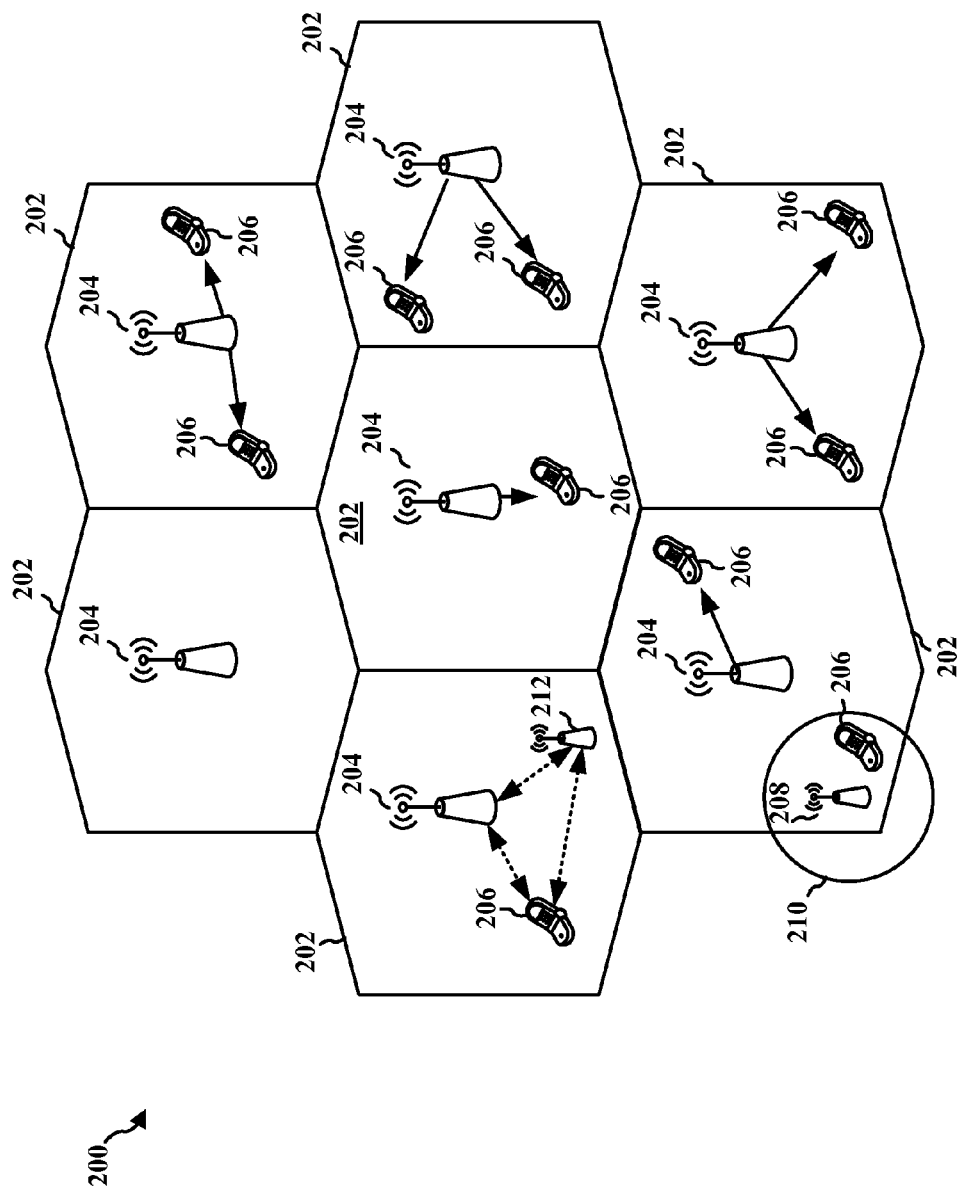
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

In an aspect, the UE 206 may communicate signals via the LTE network and an mmW system. Accordingly, the UE 206 may communicate with the eNB 204 over a LTE link and communicate with a CP or BS 212 (capable of mmW system communication) over an mmW link. In a further aspect, the eNB 204 and the CP/BS 212 may communicate signals via the LTE network and the mmW system. As such, the UE 206 may communicate with the eNB 204 over a LTE link and an mmW link (when the eNB 204 is capable of mmW system communication), or communicate with the CP/BS 212 over an mmW link and a LTE link (when the CP/BS 212 is capable of LTE network communication). In yet another aspect, the eNB 204 communicates signals via the LTE network and the mmW system, while the CP/BS 212 communicates signals via the mmW system only. Accordingly, the CP/BS 212 unable to signal the eNB 204 via the LTE network may communicate with the eNB 204 over an mmW backhaul link.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a multiplexing technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
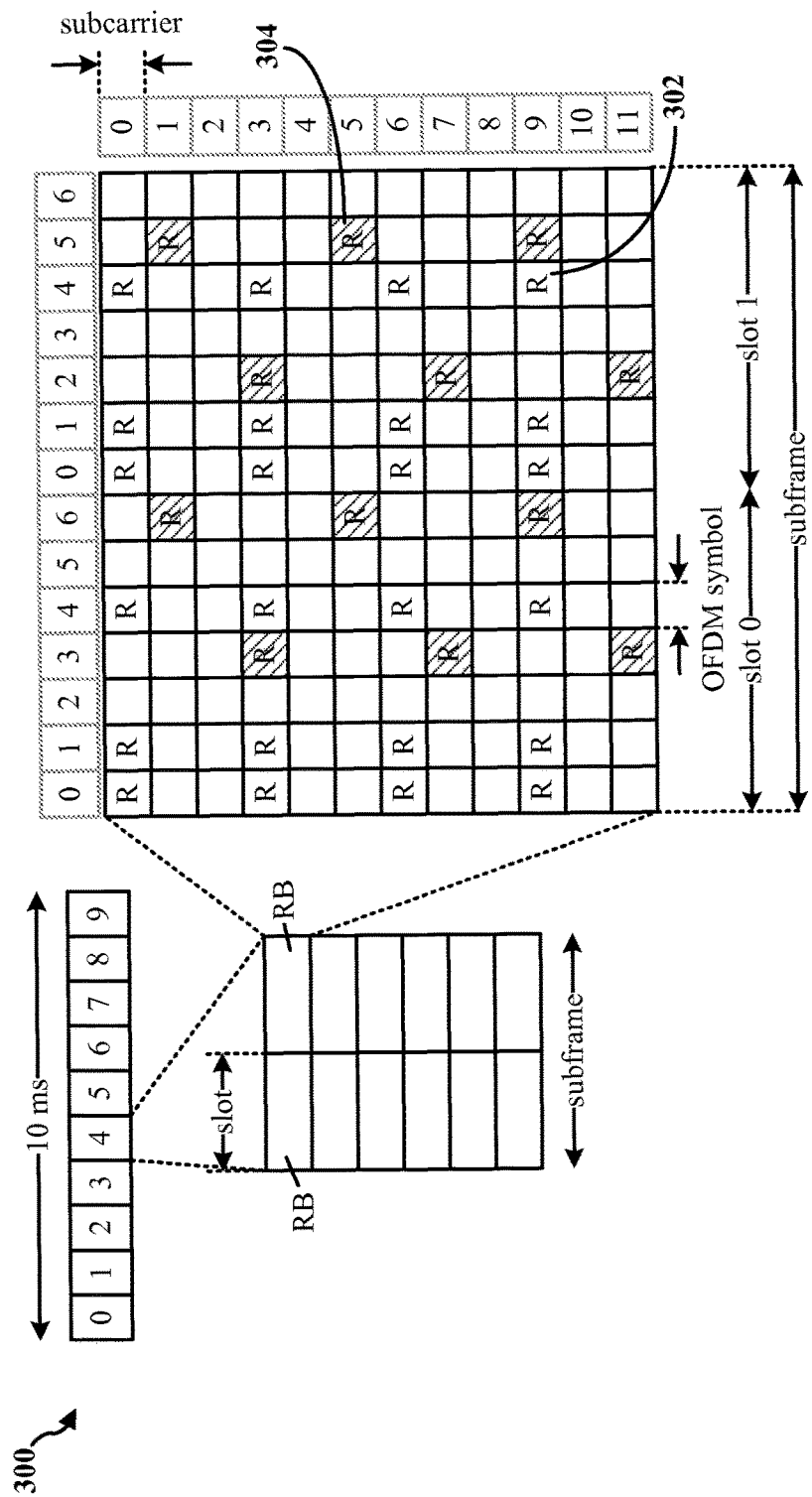
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
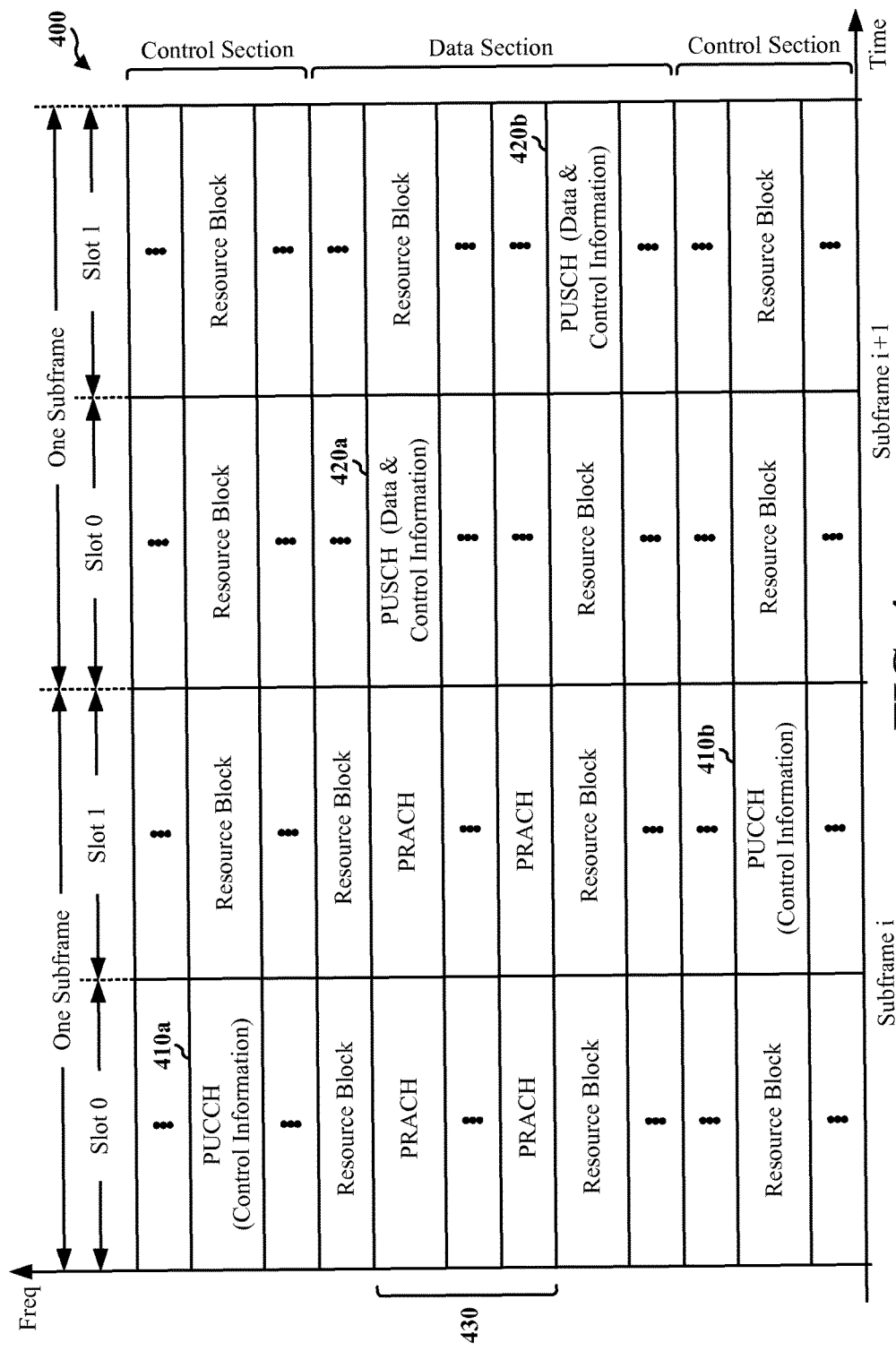
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
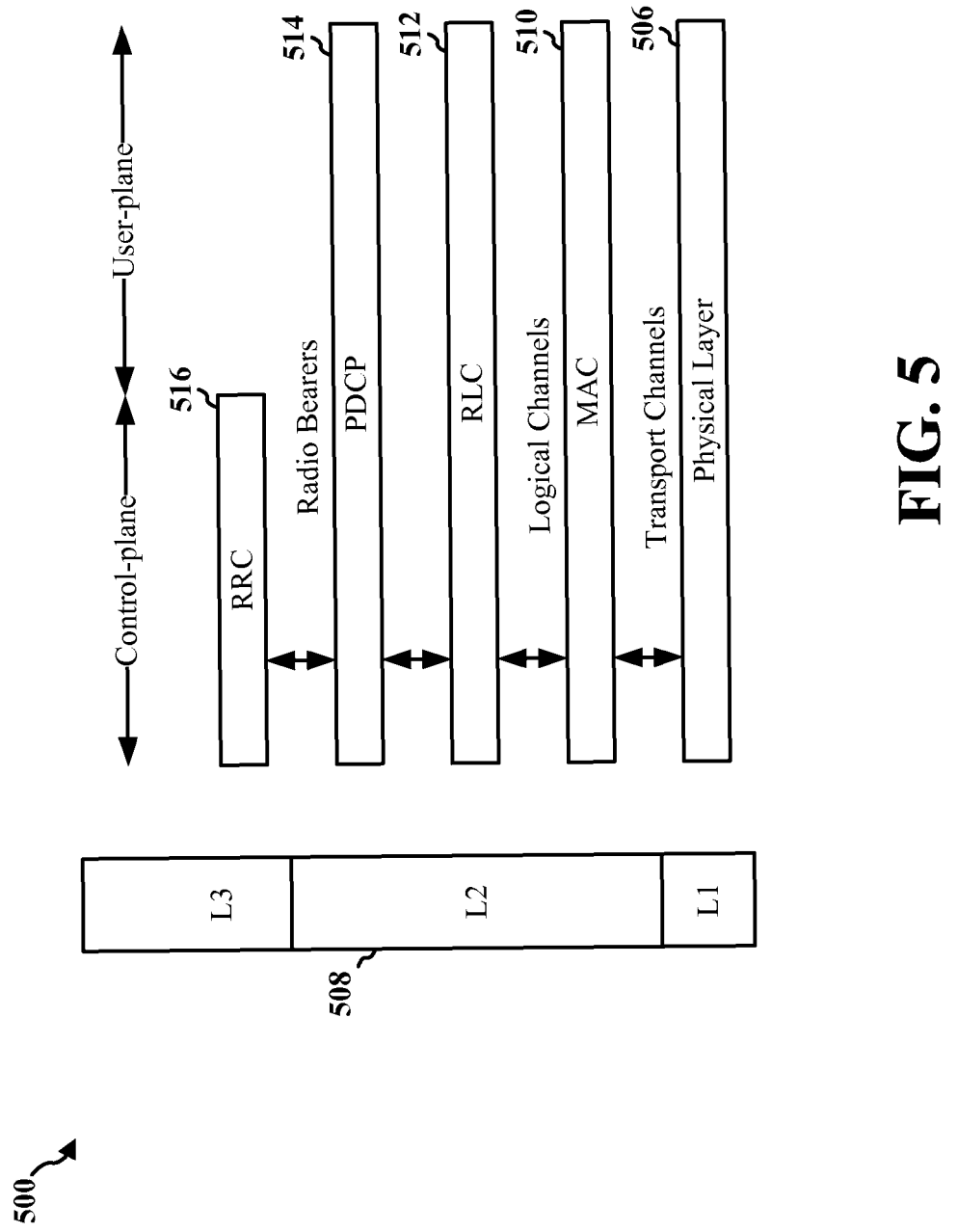
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
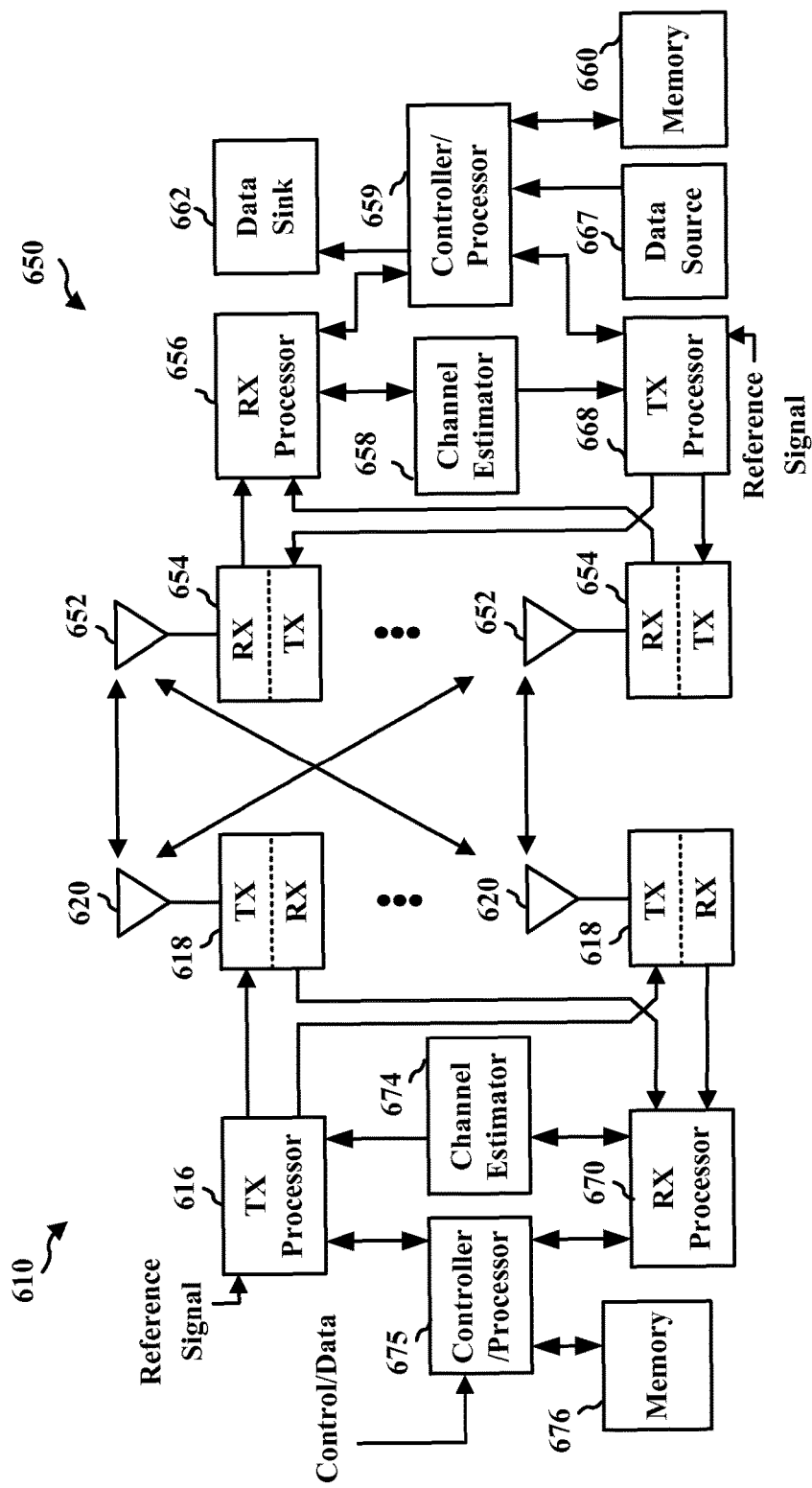
FIG. 6 is a diagram illustrating an example of an evolved Node B and user equipment in an access network.

FIG. 6 is a block diagram of a base station 610 in communication with a UE 650 in an access network. The base station 610 may be, for example, an eNB of a LTE system, a connection point (CP)/access point/base station of an mmW system, an eNB capable of communicating signals via the LTE system and the mmW system, or a connection point (CP)/access point/base station capable of communicating signals via the LTE system and the mmW system. The UE 650 may be capable of communicating signals via the LTE system and/or the mmW system. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654 RX receives a signal through its respective antenna 652. Each receiver 654 RX recovers information modulated onto an RF carrier and provides the information to receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 610. These soft decisions may be based on channel estimates computed by the channel estimator 658. The soft decisions are then decoded and deinterleaved to recover the data and control signals that were originally transmitted by the base station 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the DL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the base station 610, the controller/processor 659 implements the L2 layer for the user plane and the control plane by providing header compression, ciphering, packet segmentation and reordering, and multiplexing between logical and transport channels based on radio resource allocations by the base station 610. The controller/processor 659 is also responsible for HARQ operations, retransmission of lost packets, and signaling to the base station 610.

Channel estimates derived by a channel estimator 658 from a reference signal or feedback transmitted by the base station 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the base station 610 in a manner similar to that described in connection with the receiver function at the UE 650. Each receiver 618 RX receives a signal through its respective antenna 620. Each receiver 618 RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
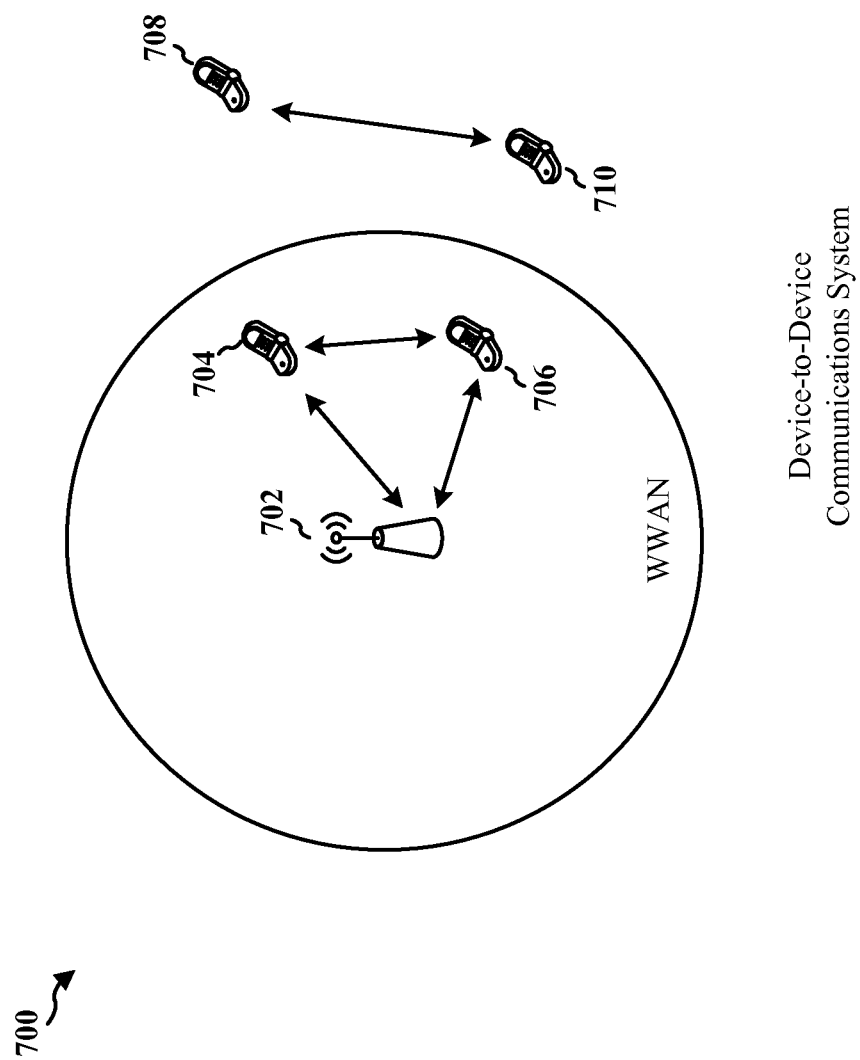
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

An mmW system is a wireless communication system designed to operate at very high frequency bands (e.g., an mmW system using carriers in the frequency range of 10.0 GHz to 300.0 GHz)). Such high carrier frequencies allow for the use of large bandwidths. While the typical use-cases in such bands have been backhaul, the spectrum may be implemented for use by UEs to access the network.

In an aspect, devices (e.g., a UE or an mmW-BS) at either end of a link in an mmW system may use multiple antennas (also referred to as phased arrays) to perform beamforming in order to achieve better link gain. The channel characteristics at high carrier frequencies necessitate beamforming approaches to overcome propagation losses. Such beamforming may allow a network to avoid being heavily interference limited and may allow the network to support the parallel scheduling of many links due to their spatial and angular separation.

Figure 8:
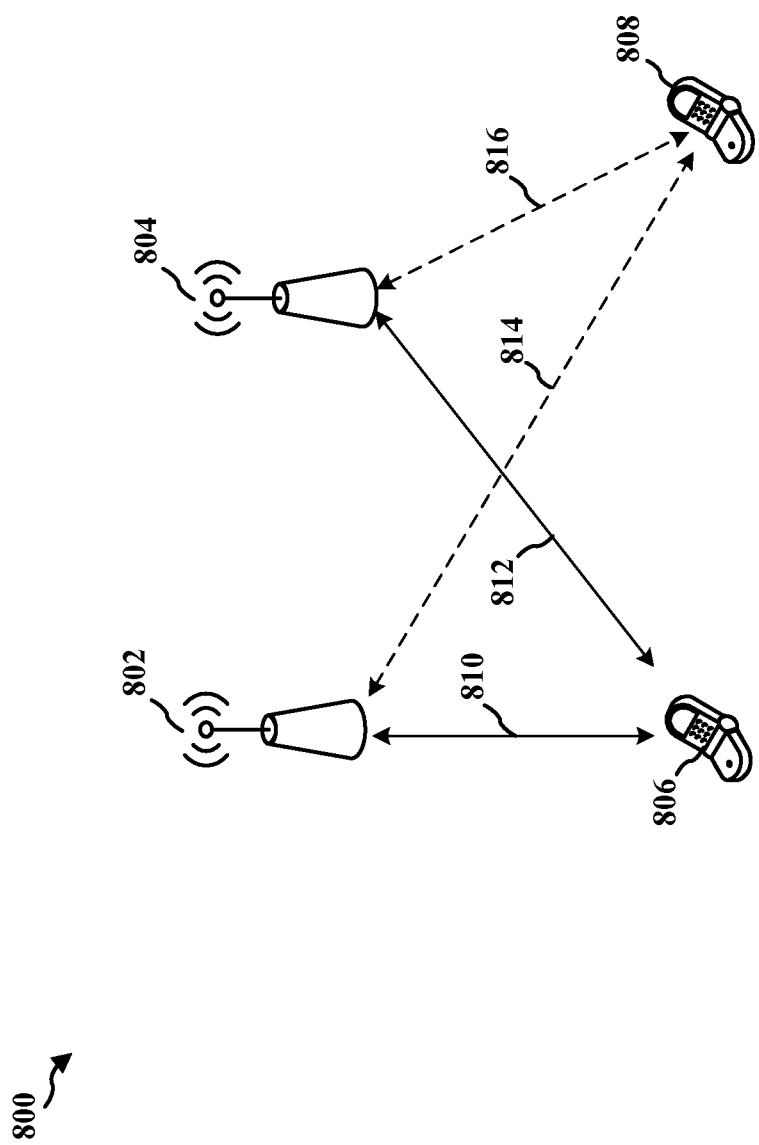
FIG. 8 is a diagram illustrating an mmW system.

FIG. 8 is a diagram illustrating an mmW system 800. As shown in FIG. 8, mmW system 800 includes mmW-BSs 802, 804 and UEs 806, 808. In the aspect of FIG. 8, the mmW-BSs 802, 804 are deployed in a region that allows UEs 806, 808 to connect to the mmW-BSs 802, 804 over high bandwidth, highly beamformed channels. Beamforming is the operation by which different antennas of a UE are combined with different weights in order to provide higher gain in one or more directions of the antennas and reject the signal received from other directions. For example, UE 806 may communicate with mmW-BS 802 via mmW link 810 and may communicate with mmW-BS 804 via mmW link 812. In such example, UE 808 may communicate with mmW-BS 802 via mmW link 814 and may communicate with mmW-BS 804 via mmW link 816. In an aspect, the mmW-BSs 802, 804 may perform a role similar to eNBs or access points.

In an aspect, an antenna array of a device (e.g., a UE) in an mmW system may be steered by directing beams towards angles of arrival and/or angles of departure corresponding to paths between devices in the mmW system. For example, an angle of departure in the azimuth may be denoted as "$\phi_T$" and an angle of arrival in the azimuth may be denoted as "$\phi_R$", and an angle of departure in the elevation may be denoted as "$\theta_T$" and an angle of arrival in the elevation may be denoted as "$\theta_R$". A beamforming scheme may correspond to steering an antenna array to a subset of the dominant scattering paths between a device (e.g., UE 806) and another device (e.g., mmW-BS 802). Accordingly, an mmW-BS and/or UE may transmit training symbols over training beamforming vectors with array properties and may sweep over the angular space. In an aspect, the mmW-BS and/or UE may sweep over a subset of the angular space.

The angles and the gains (magnitude and phase) of the paths between devices in the mmW system (e.g., mmW system 800) may change over time due to the relative mobility between the mmW-BS (e.g., mmW-BS 802), the scatterers, and/or the UE (e.g., UE 806). In one scenario, such relative mobility may include the angular movement (e.g., spatial rotation) of the UE by the user. In another scenario, the paths between devices in the mmW system may be momentarily blocked by obstacles. Determination of the different directions and paths between devices in the mmW system without any prior information may be difficult and may require more signaling and resources than tracking the paths over time from the point of initial search.

In an aspect, the behavior of various specular components with respect to a particular mmW-BS may be tracked. In an aspect, a UE (e.g., UE 806) or mmW-BS (e.g., mmW-BS 802) may track the currently used dominant paths. In another aspect, the UE or mmW-BS may switch to a better path. Given the presence of multiple mmW-BSs within an area, switching between one mmW-BS and another mmW-BS may sometimes be preferable to switching to a different path or subpaths to the same mmW-BS.

Figure 9:
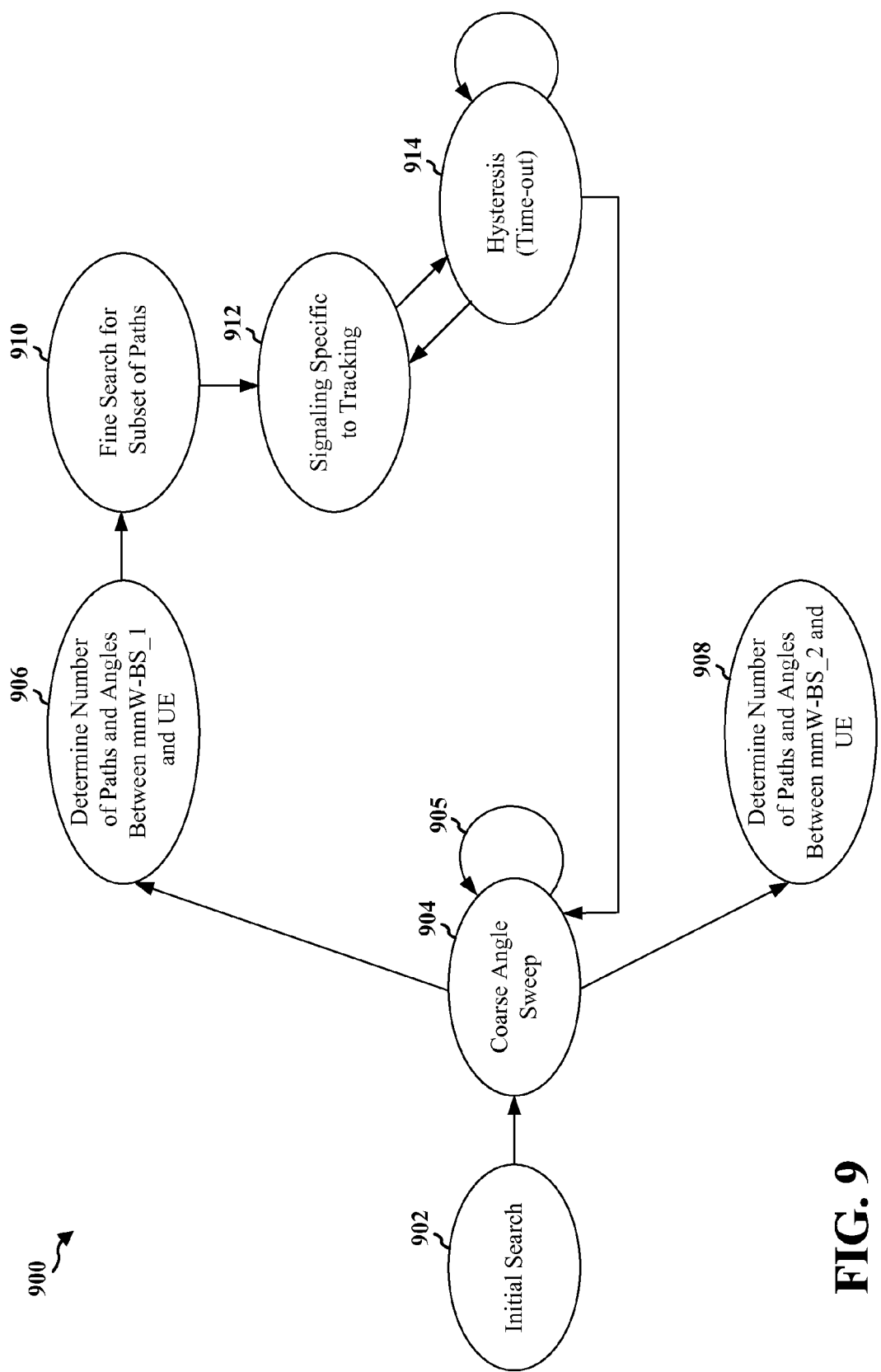
FIG. 9 is a diagram illustrating a procedure for a UE for selecting between different mmW-BSs and tracking the paths between various mmW-BSs over the duration of the mmW activity at a UE.

FIG. 9 is a diagram 900 illustrating a procedure for a UE (e.g., UE 806) for selecting between different mmW-BSs (e.g., mmW-BSs 802, 804) and tracking the paths between various mmW-BSs over the duration of the mmW activity at a UE. In an aspect, a UE may perform an initial search (also referred to as a primary search) for determining angles of beams and to associate with an mmW-BS (e.g., "mmW-BS$_1$ 802") with L dominant paths, where each of the L dominant paths is defined by a set of angles of arrival and departure. For example, the set of angles of arrival and departure for a path i between the UE 806 and the mmW-BS 802 may be denoted as $\{\theta_T^i, \phi_T^i, \theta_R^i, \phi_R^i\}$. For each path, the corresponding index i in the set of angles of arrival and departure may be an integer from 1 to L in the decreasing order of dominance and typically, L=2 paths would trade off between path/angular diversity and complexity of beamformer design. For example, the set of angles of arrival and departure for a most dominant path (e.g., i=1) may be denoted as $\{\theta_T^1, \phi_T^1, \theta_R^1, \phi_R^1\}$.

As shown in FIG. 9, a UE (e.g., UE 806) may initiate an initial search 902 and perform a coarse angle sweep 904 of a set of training beamforming vectors received from mmW-BSs. In an aspect, and as shown in FIG. 9, the coarse angle sweep 904 may allow the UE to determine 906 a number of paths and angles between a first mmW-BS (e.g., mmW-BS$_1$ 802) and the UE. In another aspect, the coarse angle sweep 904 may further allow the UE to determine 908 a number of paths and angles between a second mmW-BS (e.g., mmW-BS$_2$ 804) and the UE. In an aspect, a third mmW-BS (e.g., mmW-BS$_3$) may not be discovered, but may potentially be used for beam switching at a later point in time. In an aspect, the UE 904 may continue to perform the coarse angle sweep 904 as long as a connection to an mmW-BS is required as indicated by the arrow 905.

In an aspect, if the first mmW-BS provides a higher signal quality and/or a higher beamforming quality than the second mmW-BS, the UE may associate with first mmW-BS (e.g., by establishing a communication link with the first mmW-BS) and may not associate with the second mmW-BS. For example, the UE may identify dominant paths to different mmW-BSs (e.g., mmW-BS$_1$ 802, mmW-BS$_2$ 804) and may choose to associate with the mmW-BS that provides a dominant path with a highest signal quality or with a signal quality that exceeds a threshold. In an aspect, the UE may determine a channel quality (e.g., an SINR value) among the different beams. In such aspect, the UE may choose the mmW-BS with the highest SINR value and may establish a communication link for data transmission.

Over the duration of the communication link, the path of the communication link may change and the UE and first mmW-BS may need to track the path of the communication link. For example, the path of the communication link may change due to the previously discussed relative mobility between the first mmW-BS, the scatterers, and the UE. In an aspect, the UE may request a fine search 910 for a subset of paths close to the path of the communication link. For example, the UE may make the request by transmitting a signal to the first mmW-BS. The UE and the first mmW-BS may exchange signals 912 specific to tracking the path of the communication link. In an aspect, the UE and the first mmW-BS may send and receive beamformed training signals and update their beams/steering angles to track the path of the communication link. If the beamformed training signals are not received by either the UE or first mmW-BS within a threshold period of time, hysteresis 914 may return to the signaling 912 by requesting retransmission of the beamformed training signals. In an aspect, the UE and the first mmW-BS may perform a fine adjustment 910 by performing a fine search for a subset of paths or perform either a path switch or an mmW-BS switch depending on the measured channel quality.

In one scenario, the UE (e.g., UE 906) may perform the coarse angle sweep 904 and may identify the presence of multiple mmW-BSs (e.g., mmW-BS$_1$ 802 and mmW-BS$_2$ 804). The UE may choose to associate or select a subset of the mmW-BSs for establishing a communication link or for further tracking. In an aspect, the selection may be performed based on the coarse angle sweep 904. The mmW-BS (e.g., mmW-BS$_1$ and/or mmW-BS$_2$) and/or UE may identify the dominant paths between a given mmW-BS and UE pair.

In another scenario, the dominant set of angles (e.g., $\theta_T^1$, $\phi_T^1$, $\theta_R^1$, $\phi_R^1$) connecting the UE (e.g., UE 806) and the first mmW-BS (e.g., mmW-BS$_1$ 802) may be off by a small margin. In such a scenario, the associated angles may be corrected and refined with a beam realignment phase (e.g., consisting of a packet of localized beams around the associated angles discovered in the primary search). For example, a fine-tuning algorithm may use a set of K angles in the vicinity of the known angle for probing/training and received SNR estimation. An mmW-BS and UE pair may choose to refine only a subset of the beams identified in the coarse angle sweep 904. For example, the fine-tuning algorithm may be three closely-spaced beams around a dominant direction at the first mmW-BS and by a UE sweep of a few directions around each dominant angle for each of the dominant first mmW-BS directions.

In another scenario, the received SINR of the dominant path may drop significantly due to physical rotations caused at the UE (e.g., UE 806) by the user. In such a scenario, first mmW-BS (e.g., mmW-BS$_1$ 802) may discover the loss of SINR on the dominant path and request a fine-tuning algorithm as described above and correct the beamforming for the dominant path.

In an alternative scenario, the received SINR associated with the dominant path may drop significantly due to relative mobility or changes in propagation dynamics. Such a scenario may occur, for example, when a path is physically blocked by an obstacle. In this scenario, the communication link between the first mmW-BS (e.g., mmW-BS$_1$ 802) and UE (e.g., UE 806) may either switch to the known angles of the next best dominant path (e.g., $\theta_T^2$, $\phi_T^2$, $\theta_R^2$, $\phi_R^2$) or initiate a fine-tune phase for the newly selected beam realignment phase as described in the first scenario.

In another scenario, the received SINR of all the known dominant paths associated with the first mmW-BS (e.g., mmW-BS$_1$ 802) may be too low for realizing the data rate needs of the UE (e.g., UE 806). In such a scenario, the UE may determine that the second mmW-BS (e.g., mmW-BS$_2$ 804) may be preferred over the first mmW-BS with respect to a particular purpose (e.g., data rate purposes or security purposes). In such scenario, the UE may request the second mmW-BS for either an initial angle discovery or an incremental angle learning phase. For example, the UE may make the request despite any knowledge the UE may already have of the angles connecting the UE to second mmW-BS. Association of paths between the UE and second mmW-BS may be performed as discussed supra.

In another scenario, the received SINR of all the known dominant paths associating both a first mmW-BS (e.g., mmW-BS$_1$ 802) and a second mmW-BS (e.g., mmW-BS$_2$ 804) may fail to meet the data rate demands of the UE (e.g., UE 806). In such a scenario, the UE may initiate the initial search 902 (or a reboot process) and seek a coarse angle sweep 904 that may discover the first mmW-BS, second mmW-BS, or third mmW-BS. The UE may then associate with the discovered first mmW-BS, second mmW-BS, or third mmW-BS that meets the data rate demands of the UE.

Figure 10:
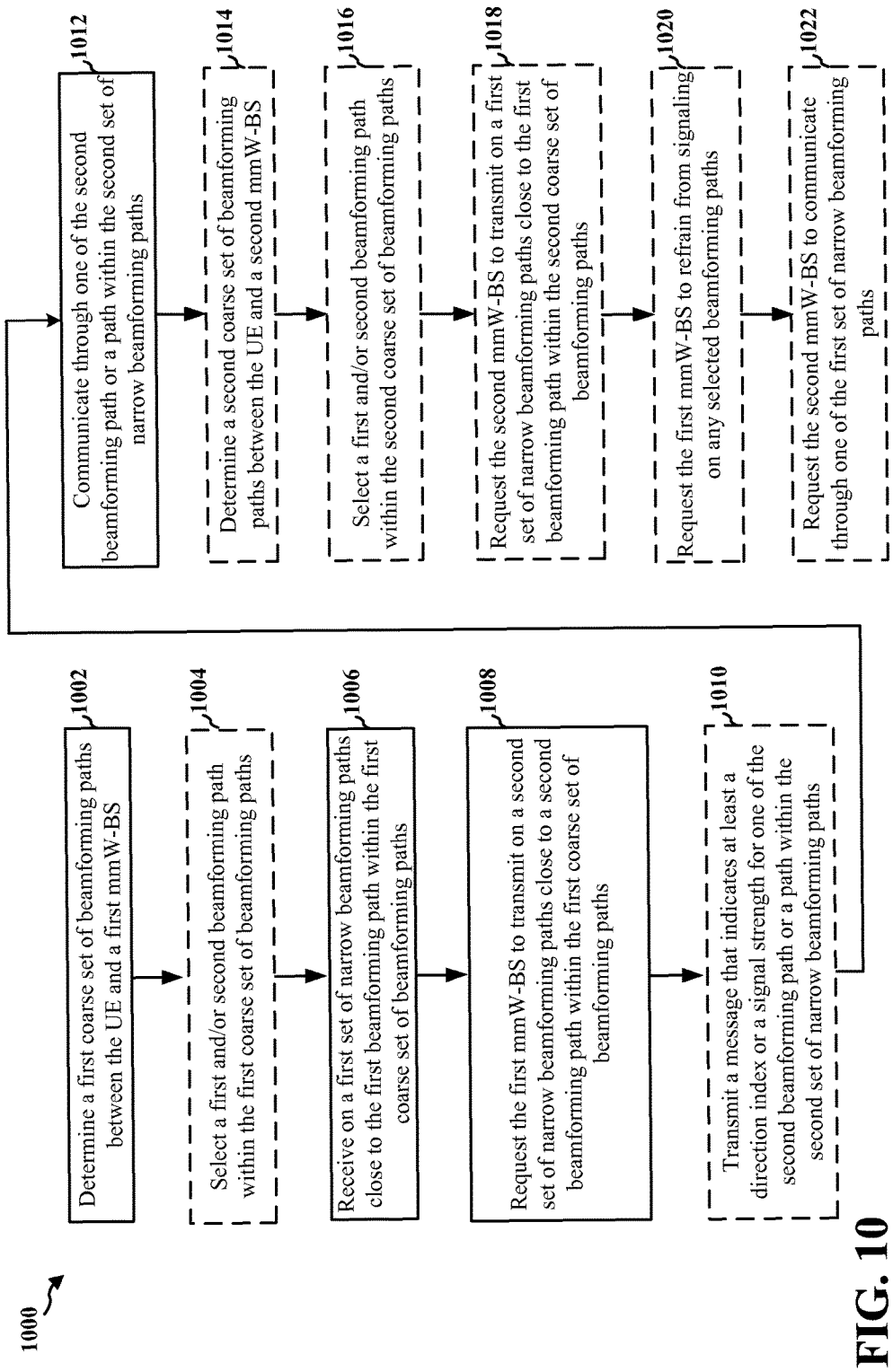
FIG. 10 is a flow chart of a method of wireless communication.

FIG. 10 is a flow chart 1000 of a method of wireless communication. The method may be performed by a UE (e.g., the UE 806, the apparatus 1102/1102'). It should be understood that the steps indicated in dotted lines in FIG. 10 represent optional steps.

At step 1002, the UE determines a first coarse set of beamforming paths between the UE and a first mmW-BS. For example, the UE may receive a first signal from a first mmW-BS and may use the first signal to determine at least two beamforming direction pairs ($i_k$ and $j_k$, k≥2) with $i_k$ corresponding to the first mmW-BS and $j_k$ corresponding to the UE.

At step 1004, the UE selects at least a first or second beamforming path within the first coarse set of beamforming paths. In an aspect, the UE may select the beamforming path with the highest signal quality (e.g., highest signal strength). For example, if the first beamforming path has the highest signal quality within the first coarse set of beamforming paths, the UE may select the first beamforming path.

At step 1006, the UE receives on a first set of narrow beamforming paths close to a first beamforming path within the first coarse set of beamforming paths.

At step 1008, the UE requests the first mmW-BS to transmit on a second set of narrow beamforming paths close to a second beamforming path within the first coarse set of beamforming paths when a signal quality of the first beamforming path and the first set of narrow beamforming paths are less than a first threshold. In an aspect, the UE may make the request by transmitting a second signal to the first mmW-BS that requests adjustment of the transmit beamforming direction to be used by the first mmW-BS. In an aspect, the UE may receive a third signal from the first mmW-BS to track the selected first beamforming path as a function of the received signal strength of the third signal.

At step 1010, the UE transmits a message that indicates at least a direction index or a signal strength for one of the second beamforming path or a path within the second set of narrow beamforming paths. In an aspect, the message may be transmitted to the mmW-BS with which a communication link is established.

At step 1012, the UE communicates through one of the second beamforming path or a path within the second set of narrow beamforming paths.

At step 1014, the UE determines a second coarse set of beamforming paths between the UE and a second mmW-BS. For example, the UE may receive a fourth signal from a second mmW-BS and may use the fourth signal to determine at least another two beamforming direction pairs between the second mmW-BS and the UE.

At step 1016, the UE selects at least a first or second beamforming path within the second coarse set of beamforming paths. In an aspect, the UE selects at least the first or second beamforming path by measuring the signal strength of the first and second beamforming paths and selecting the beamforming path (e.g., a beamforming pair corresponding to a beamforming path) with the highest signal strength.

At step 1018, the UE requests the second mmW-BS to transmit on a first set of narrow beamforming paths close to a first beamforming path within the second coarse set of beamforming paths when a signal quality of all selected beamforming paths corresponding to the first mmW-BS are less than a second threshold.

At step 1020, the UE requests the first mmW-BS to refrain from signaling on any selected beamforming paths.

At step 1022, the UE requests the second mmW-BS to communicate through one of the first set of narrow beamforming paths.

Figure 11:
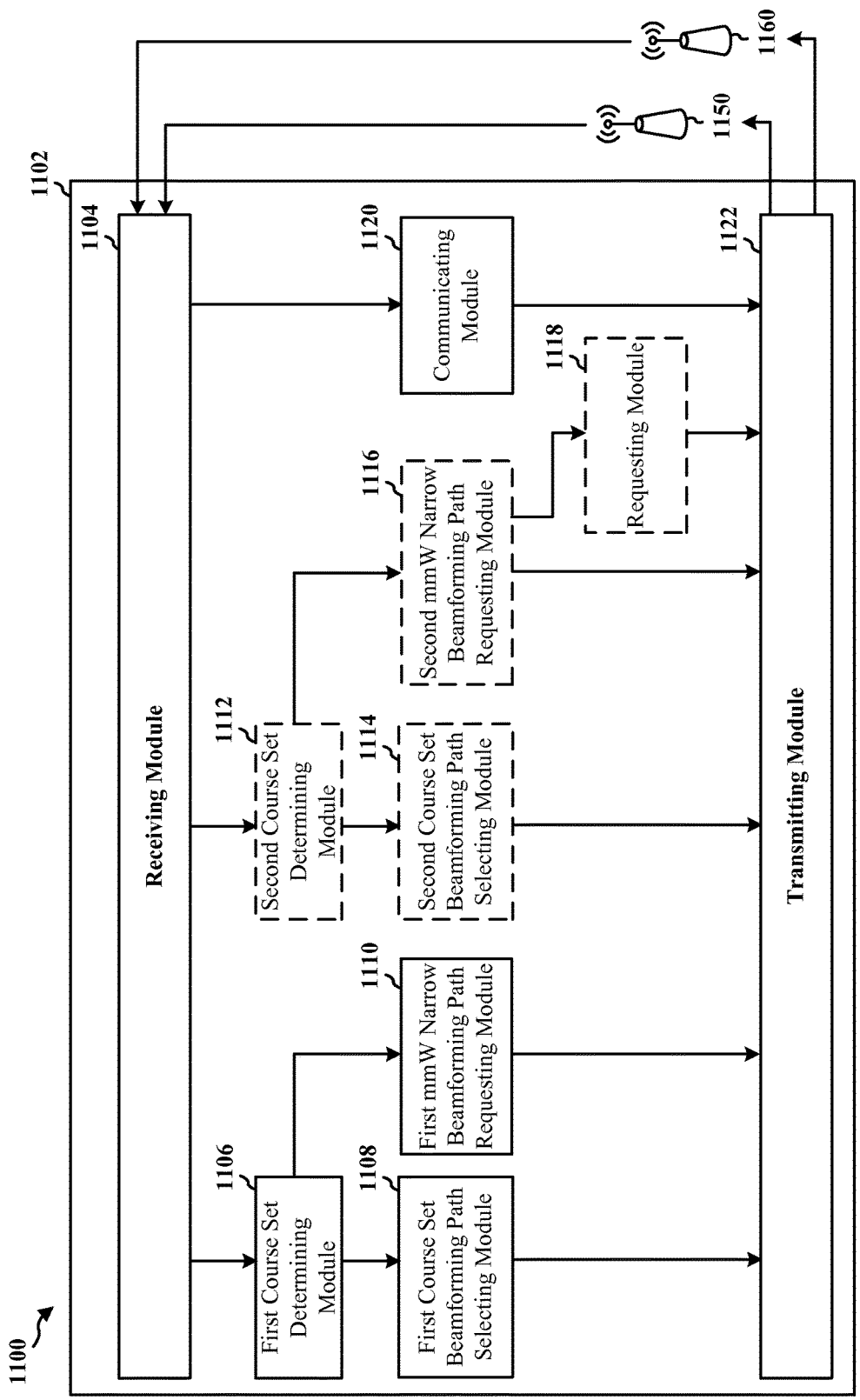
FIG. 11 is a data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE. The apparatus includes a module 1104 that receives on a first set of narrow beamforming paths close to a first beamforming path within the first coarse set of beamforming paths, a module 1106 that determines a first coarse set of beamforming paths between the UE and a first mmW-BS (e.g., mmW-BS 1150), a module 1108 that selects at least a first or second beamforming path within the first coarse set of beamforming paths, a module 1110 that requests the first mmW-BS to transmit on a second set of narrow beamforming paths close to a second beamforming path within the first coarse set of beamforming paths when a signal quality of the first beamforming path and the first set of narrow beamforming paths are less than a first threshold, a module 1112 that determines a second coarse set of beamforming paths between the UE and a second mmW-BS (e.g., mmW-BS 1160), a module 1114 that selects at least a first or second beamforming path within the second coarse set of beamforming paths, a module 1116 that requests the second mmW-BS to transmit on a first set of narrow beamforming paths close to a first beamforming path within the second coarse set of beamforming paths when a signal quality of all selected beamforming paths corresponding to the first mmW-BS are less than a second threshold, a module 1118 that requests the first mmW-BS to refrain from signaling on any selected beamforming paths and/or requests the second mmW-BS to communicate through one of the first set of narrow beamforming paths, a module 1120 that communicates through one of the second beamforming path or a path within the second set of narrow beamforming paths, a module 1122 that transmits a message that indicates at least a direction index or a signal strength for one of the second beamforming path or a path within the second set of narrow beamforming paths.

The apparatus may include additional modules that perform each of the steps of the algorithm in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
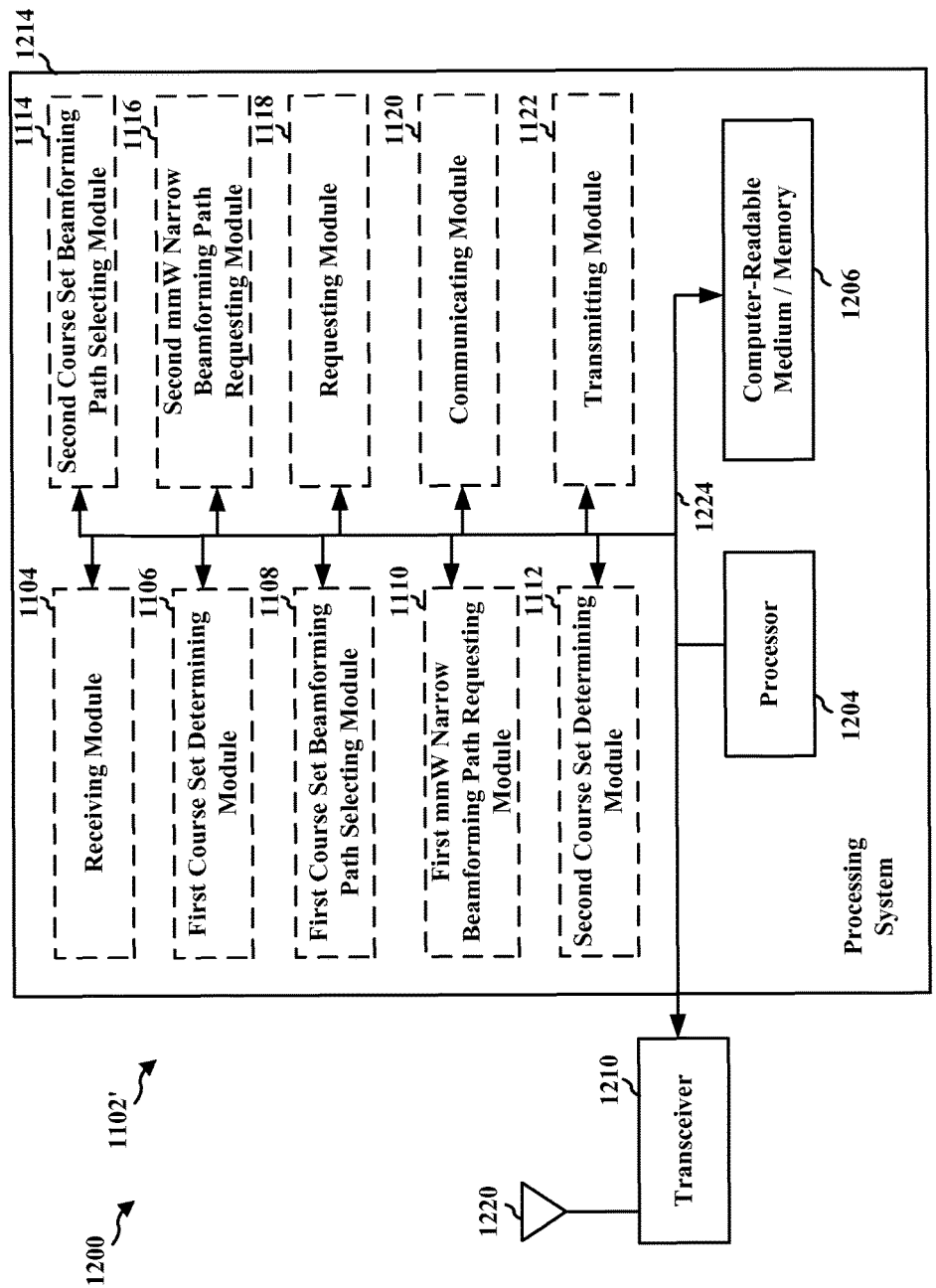
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1112, 1114, 1116, 1118, 1120, and 1122, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1104. In addition, the transceiver 1210 receives information from the processing system 1214, specifically the transmitting module 1122, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1104, 1106, 1108, 1110, 1112, 1114, 1116, 1118, 1120, and 1122. The modules may be software modules running in the processor 1204, resident/stored in the computer readable medium/memory 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1102/1102' for wireless communication includes means for determining a first coarse set of beamforming paths between the UE and a first mmW-BS, means for receiving on a first set of narrow beamforming paths close to a first beamforming path within the first coarse set of beamforming paths, means for requesting the first mmW-BS to transmit on a second set of narrow beamforming paths close to a second beamforming path within the first coarse set of beamforming paths when a signal quality of the first beamforming path and the first set of narrow beamforming paths are less than a first threshold, means for communicating through one of the second beamforming path or a path within the second set of narrow beamforming paths, means for determining a second coarse set of beamforming paths between the UE and a second mmW-BS, means for requesting the second mmW-BS to transmit on a first set of narrow beamforming paths close to a first beamforming path within the second coarse set of beamforming paths when a signal quality of all selected beamforming paths corresponding to the first mmW-BS are less than a second threshold, means for requesting the first mmW-BS to refrain from signaling on any selected beamforming paths, means for requesting the second mmW-BS to communicate through one of the first set of narrow beamforming paths, means for selecting at least a first or second beamforming path within the first coarse set of beamforming paths, means for selecting at least a first or second beamforming path within the second coarse set of beamforming paths, means for transmitting a message that indicates at least a direction index or a signal strength for one of the second beamforming path or a path within the second set of narrow beamforming paths.

The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication for a user equipment (UE), comprising:

determining a first coarse set of beamforming paths between the UE and a first millimeter wave base station (mmW-BS);
selecting a first beamforming path and a second beamforming path within the first coarse set of beamforming paths;
receiving on a first set of narrow beamforming paths close to the first beamforming path within the first coarse set of beamforming paths;
determining to associate with the first mmW-BS based on the receiving on the first set of narrow beamforming paths;
requesting, based on the determining to associate with the first mmW-BS, the first mmW-BS to transmit on a second set of narrow beamforming paths close to the second beamforming path within the first coarse set of beamforming paths when a signal quality of the first beamforming path and the first set of narrow beamforming paths are less than a first threshold; and
communicating through one of the second beamforming path or a path within the second set of narrow beamforming paths.

2. The method of claim 1, further comprising:
determining a second coarse set of beamforming paths between the UE and a second mmW-BS;
requesting the second mmW-BS to transmit on a third set of narrow beamforming paths close to a third beamforming path within the second coarse set of beamforming paths when a signal quality of all selected beamforming paths corresponding to the first mmW-BS are less than a second threshold;
requesting the first mmW-BS to refrain from signaling on any selected beamforming paths; and
requesting the second mmW-BS to communicate through one of the third set of narrow beamforming paths.

3. The method of claim 1, wherein the first beamforming path has a highest signal quality of beamforming paths in the first coarse set of beamforming paths.

4. The method of claim 2, further comprising selecting at least a third or fourth beamforming path within the second coarse set of beamforming paths.

5. The method of claim 1, further comprising: transmitting a message that indicates a signal strength for one of the second beamforming path or a path within the second set of narrow beamforming paths.

6. A user equipment (UE) for wireless communication, comprising:
means for determining a first coarse set of beamforming paths between the UE and a first millimeter wave base station (mmW-BS);
means for selecting a first beamforming path and a second beamforming path within the first coarse set of beamforming paths;
means for receiving on a first set of narrow beamforming paths close to the first beamforming path within the first coarse set of beamforming paths;
means for determining to associated with the first mmW-BS based on the receiving on the first set of narrow beamforming paths;
means for requesting, based on the determining to associate with the first mmW-BS, the first mmW-BS to transmit on a second set of narrow beamforming paths close to the second beamforming path within the first coarse set of beamforming paths when a signal quality of the first beamforming path and the first set of narrow beamforming paths are less than a first threshold; and
means for communicating through one of the second beamforming path or a path within the second set of narrow beamforming paths.

7. The UE of claim 6, further comprising:
means for determining a second coarse set of beamforming paths between the UE and a second mmW-BS;
means for requesting the second mmW-BS to transmit on a third set of narrow beamforming paths close to a third beamforming path within the second coarse set of beamforming paths when a signal quality of all selected beamforming paths corresponding to the first mmW-BS are less than a second threshold;
means for requesting the first mmW-BS to refrain from signaling on any selected beamforming paths; and
means for requesting the second mmW-BS to communicate through one of the third set of narrow beamforming paths.

8. The UE of claim 6, wherein the first beamforming path has a highest signal quality of beamforming paths in the first coarse set of beamforming paths.

9. The UE of claim 7, further comprising means for selecting at least a third or fourth beamforming path within the second coarse set of beamforming paths.

10. The UE of claim 6, further comprising: means for transmitting a message that indicates a signal strength for one of the second beamforming path or a path within the second set of narrow beamforming paths.

11. A user equipment (UE) for wireless communication, comprising:
a memory; and
at least one processor coupled to the memory and configured to:
determine a first coarse set of beamforming paths between the UE and a first millimeter wave base station (mmW-BS);
select a first beamforming path and a second beamforming path within the first coarse set of beamforming paths;
receive on a first set of narrow beamforming paths close to the first beamforming path within the first coarse set of beamforming paths;
determine to associate with the first mmW-BS based on the reception on the first set of narrow beamforming paths;
request, based on the determination to associated with the first mmW-BS, the first mmW-BS to transmit on a second set of narrow beamforming paths close to the second beamforming path within the first coarse set of beamforming paths when a signal quality of the first beamforming path and the first set of narrow beamforming paths are less than a first threshold; and
communicate through one of the second beamforming path or a path within the second set of narrow beamforming paths.

12. The UE of claim 11, wherein the at least one processor is further configured to:
determine a second coarse set of beamforming paths between the UE and a second mmW-BS;
request the second mmW-BS to transmit on a third set of narrow beamforming paths close to a third beamforming path within the second coarse set of beamforming paths when a signal quality of all selected beamforming paths corresponding to the first mmW-BS are less than a second threshold;
request the first mmW-BS to refrain from signaling on any selected beamforming paths; and request the second mmW-BS to communicate through one of the third set of narrow beamforming paths.

13. The UE of claim 11, wherein the first beamforming path has a highest signal quality of beamforming paths in the first coarse set of beamforming paths.

14. The UE of claim 12, wherein the at least one processor is further configured to select at least a third or fourth beamforming path within the second coarse set of beamforming paths.

15. The UE of claim 11, wherein the at least one processor is further configured to transmit a message that indicates a signal strength for one of the second beamforming path or a path within the second set of narrow beamforming paths.

16. A non-transitory computer-readable medium storing computer-executable code, comprising code to:
   determine a first coarse set of beamforming paths between the UE and a first millimeter wave base station (mmW-BS);
   select a first beamforming path and a second beamforming path within the first coarse set of beamforming paths;
   receive on a first set of narrow beamforming paths close to a first beamforming path within the first coarse set of beamforming paths;
determining to associate with the first mmW-BS based on the reception on the first set of narrow beamforming paths
   request, based on the determination to associate, the first mmW-BS to transmit on a second set of narrow beamforming paths close to a second beamforming path within the first coarse set of beamforming paths when a signal quality of the first beamforming path and the first set of narrow beamforming paths are less than a first threshold, the direction index associated with the second set of narrow beamforming paths close to the second beamforming path; and
   communicate through one of the second beamforming path or a path within the second set of narrow beamforming paths.

17. The computer-readable medium of claim 16, further comprising code to:
   determine a second coarse set of beamforming paths between the UE and a second mmW-BS;
   request the second mmW-BS to transmit on a third set of narrow beamforming paths close to a third beamforming path within the second coarse set of beamforming paths when a signal quality of all selected beamforming paths corresponding to the first mmW-BS are less than a second threshold;
   request the first mmW-BS to refrain from signaling on any selected beamforming paths; and
   request the second mmW-BS to communicate through one of the third set of narrow beamforming paths.

18. The computer-readable medium of claim 16, wherein the first beamforming path has a highest signal quality of beamforming paths in the first coarse set of beamforming paths.

19. The computer-readable medium of claim 17, further comprising code to select at least a third or fourth beamforming path within the second coarse set of beamforming paths.

20. The computer-readable medium of claim 16, further comprising code to transmit a message that indicates a signal strength for one of the second beamforming path or a path within the second set of narrow beamforming paths.

* * * * *